US009875432B2

United States Patent
Motohashi et al.

(10) Patent No.: US 9,875,432 B2
(45) Date of Patent: Jan. 23, 2018

(54) CARD HOLDING MEMBER AND CARD CONNECTOR SET

(71) Applicant: Molex, LLC, Lisle, IL (US)

(72) Inventors: Nobumasa Motohashi, Yamato (JP); Akihiro Shimotsu, Ebina (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/157,577

(22) Filed: May 18, 2016

(65) Prior Publication Data

US 2016/0359269 A1 Dec. 8, 2016

(30) Foreign Application Priority Data

Jun. 8, 2015 (JP) .................................. 2015-115807

(51) Int. Cl.
*H01R 13/62* (2006.01)
*G06K 13/08* (2006.01)
*G06K 7/00* (2006.01)

(52) U.S. Cl.
CPC ....... *G06K 13/0831* (2013.01); *G06K 7/0021* (2013.01); *G06K 7/0056* (2013.01); *G06K 13/08* (2013.01); *G06K 13/0812* (2013.01)

(58) Field of Classification Search
CPC .............. H01R 13/633; H01R 13/6335; H01R 13/2442; H01R 23/7005; H01R 23/7068; G06K 7/0021
USPC .......................... 439/159, 160, 630, 483, 278
See application file for complete search history.

(56) References Cited

U.S. PATENT DOCUMENTS

| 5,125,505 A | * | 6/1992 | Kurosaki | ............. | A45C 11/182 206/38 |
| 7,044,762 B1 | * | 5/2006 | Hong | ................. | H01R 13/6275 439/275 |
| 7,125,258 B2 | * | 10/2006 | Nakakubo | ........ | G06K 19/07741 439/328 |
| 8,591,240 B2 | * | 11/2013 | Jenks | ..................... | G11B 17/00 439/159 |

(Continued)

FOREIGN PATENT DOCUMENTS

| CN | 104158927 A | 11/2014 |
| JP | 08-335255 A | 12/1996 |
| JP | 2012-234669 A | 11/2012 |

(Continued)

*Primary Examiner* — Hien Vu
(74) *Attorney, Agent, or Firm* — James A. O'Malley

(57) ABSTRACT

A card holding member is able to be inserted into a card connector via a sealing portion of an outer member and able to hold a card. The holding member includes a card holding frame portion, a connecting base portion, and a movable connecting portion. The frame portion opposing side surfaces of the card. The base portion integrally connects to the frame portion. The movable portion mounts on the base portion in the insertion/ejection direction of the holding member. The base portion includes a first sealed portion which engages a first sealing portion of the sealing portion and formed on the outer peripheral surface of the base portion. The movable portion includes a pressure receiving portion which engages a pressure imparting portion of the sealing portion. The movable portion is biased towards the insertion direction and positioned relative to the outer member when the receiving portion engages the imparting portion.

10 Claims, 14 Drawing Sheets

(56) References Cited

U.S. PATENT DOCUMENTS

2016/0111802 A1* 4/2016 Shimotsu ........... H01R 12/7076
439/159

FOREIGN PATENT DOCUMENTS

| JP | 5488846 A | 9/2013 |
| JP | 2014-182920 A | 9/2014 |

* cited by examiner

CARD HOLDING MEMBER AND CARD CONNECTOR SET

RELATED APPLICATIONS

This application claims priority to Japanese Application No. 2015-115807, filed Jun. 8, 2015, which is incorporated herein by reference in its entirety.

TECHNICAL FIELD

The present disclosure relates to a card holding member and a card connector set.

BACKGROUND ART

Electronic devices such as mobile phones include a card connector enabling the use of various types of cards such as SIM (Subscriber Identity Module) cards. A sealed card connector has been proposed which can be used under conditions in which the electronic device is exposed to rain and dust (see, for example, Patent Document 1).

FIG. 14 is a diagram showing a card connector of the prior art.

In this drawing, 811 is a housing for a card connector made of an insulating material. The housing 811 has side wall portions 898 arranged inside and the side wall portions 898 are secured to the case of the electronic device. The housing 811 includes a plurality of terminals 851. When a card holder 961 housing a card is inserted into the card connector, the terminals 851 make contact with the corresponding connecting pads on the card.

An opening 898a is formed in a side wall portion 898 at a location corresponding to an insertion slot for the card connector. The card holder 961 is inserted into the card connector via this opening 898a.

When the card holder 961 has been inserted into the card connector, as shown in the drawing, the rear end surface 961b of the rear frame portion 961a of the card holder 961 is flush with the outer surfaces 898b of the side wall portions 898. A gasket 971 is attached to the outer periphery of the rear frame portion 961a of the card holder 961, and the gasket 971 seals the gap between the inner peripheral surface of the opening 898a and the outer peripheral surface of the rear frame portion 961a to protect the card connector from infiltration by water, dust, and debris.

Patent Document 1—Laid-Open Patent Publication No. 08-335255

SUMMARY

However, in the card connector of the prior art, dimensional errors sometimes occur in the housing 811, card holder 961, and other components, and assembly errors sometimes occur, for example, when the housing 811 is mounted in the case of the electronic device. In these situations, when the card holder 961 is inserted into the card connector, the rear end surface 961b of the rear frame portion 961a of the card holder 961 may not be flush with the outer surfaces 898b of the side wall portions 898 on the case, and may extend to the rear of the outer surfaces 898b. This mars the appearance of the device and opens up a gap between the rear frame portion 961 of the card holder 961 and the opening 898a in the side wall portion 898 which reduces sealing properties.

The present disclosure solves the problem associated with the prior art by providing a card holding member and a card connector set which can be reliably sealed when a movable connecting portion of the card holding member has been biased in the insertion direction and an outer member and the movable connecting portion have been properly positioned.

The present disclosure is a card holding member able to be inserted into a card connector via a sealing portion of an outer member and able to hold a card having terminal members, the card holding member comprising a card holding frame portion opposing side surfaces of the card, a connecting base portion integrally connected to the card holding frame portion, and a movable connecting portion slidably mounted on the connecting base portion in the insertion and ejection direction of the card holding member, the connecting base portion including a first sealed portion able to engage a first sealing portion of the sealing portion and formed on the outer peripheral surface of the connecting base portion, the movable connecting portion including a pressure receiving portion able to engage a pressure imparting portion of the sealing portion, and the movable connecting portion being biased towards the insertion direction and positioned relative to the outer member when the pressure receiving portion engages the pressure imparting portion.

In another card holding member of the present disclosure, the movable connecting portion includes a second sealed portion able to engage a second sealing portion of the sealing portion and formed on the outer peripheral surface of the movable connecting portion.

In another card holding member of the present disclosure, the movable connecting portion includes an ejection auxiliary engaged portion able to be engaged by an ejection auxiliary member, the application of force from the ejection auxiliary member in the ejection direction sliding the movable connecting portion in the ejection direction.

In another card holding member of the present disclosure, the movable connecting portion includes an engaging protrusion, the connecting base portion includes an engaged protrusion able to engage the engaging protrusion, and the connecting base portion slides in the ejection direction along with the movable connecting portion when the engaging protrusion engages the engaged protrusion.

In another card holding member of the present disclosure, the movable connecting portion includes a cylindrical portion receiving the inserted connecting base portion, the cylindrical portion is inserted into the insertion passage of the sealing portion, and the space between the inner peripheral surface of the insertion passage and the outer peripheral surfaces of the connecting base portion and the movable connecting portion is sealed.

In another card holding member of the present disclosure, the rear surface of the movable connecting portion is flush with the outer surface of the outer member when the movable connecting portion has been positioned relative to the outer member.

The present disclosure is also a card connector set comprising any of the aforementioned card holding member, a card connector able to receive the card holding member when inserted, and an outer member able to receive the card connector when fixed.

The present disclosure is able to provide a card holding member and a card connector set which can be reliably sealed because an outer member and a movable connecting portion of the card holding member can be properly positioned when the movable connecting portion has been biased in the insertion direction.

BRIEF DESCRIPTION OF THE DRAWINGS

FIGS. 3A and 3B are a pair of perspective views of the card connector in the embodiment of the present disclosure, in which FIG. 3A is a view with the shell attached and FIG. 3B is a view with the shell removed.

FIGS. 5A and 5B are a pair of cross-sectional views of the card connector set in the embodiment of the present disclosure with the shell removed from the card connector, in which FIG. 5A is a cross-sectional view from A-A in FIG. 4, and FIG. 5B is a cross-sectional view from B-B in FIG. 4.

FIGS. 6A and 6B are a pair of enlarged cross-sectional views of the card connector set in the embodiment of the present disclosure, in which FIG. 6A is an enlarged view of section C in FIG. 5A, and FIG. 6B is an enlarged view of section D in FIG. 5B.

DETAILED DESCRIPTION OF THE PREFERRED EMBODIMENTS

Figure 1:
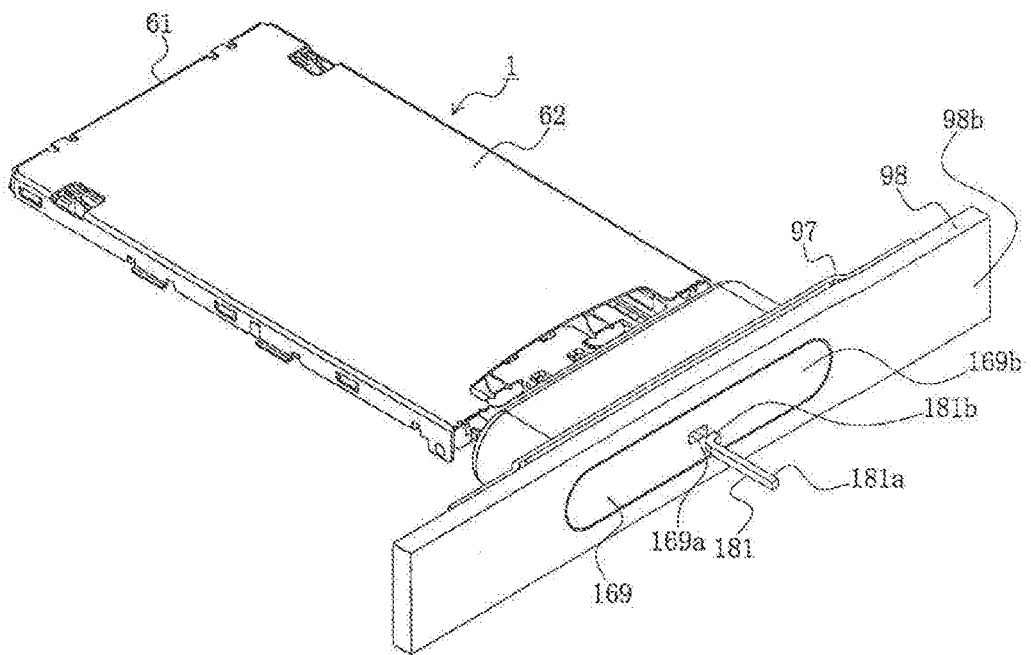
FIG. 1 is a perspective view showing a card connector set in an embodiment of the present disclosure with a card tray inserted into the card connector.

The present disclosure is a more detailed explanation of the present disclosure with reference to the drawings.

In the drawings, 160 is the card tray serving as the card holding member in the present embodiment. It is inserted into a card connector 1 mounted on an outer member 90 of an electronic device (not shown) while housing a card (not shown). In other words, a card is accommodated inside the card tray 160 with both side surfaces surrounded by a card frame portion 161 facing the side surfaces, and is mounted in an electronic device via a card connector 1. The electronic device may be any type of device, including a personal computer, a mobile phone, a smartphone, a communication modem, a tablet, a digital camera, a video camera, a music player, a gaming console, or a car navigation system.

However, when a card connector other than the card connector 1 is mounted in an electronic device, the user may decide not to use the card connector 1. In this case, the user may insert the card tray 160 without a card, that is, an empty card tray 160, into the card connector 1 for storage.

The card can be any type of memory card such as a SIM card, a microSIM card, nanoSIM card, MMC® multimedia card, SD® secure digital card, miniSD® card, xD-Picture® card, Memory Stick®, Memory Stick Duo®, Smart Media®, or Trans-Flash® memory card. In the explanation of the present embodiment, a microSD® card or a nanoSIM card can be used. The SD Card Association, which is the standard setting body for SD® cards, has set the size of microSD® cards at 15 mm×11 mm×1.0 mm (L×W×D). In accordance with the ETSI TS 102 221 V11.00 card standard, the nanoSIM card has a longitudinal length of 12.3 mm, a width of 8.8 mm, and a thickness of 0.67 mm.

In the frame portion 161 of the card tray 160 of the present embodiment, the space 165 serving as the card accommodating space is divided into a first space 165a positioned in the front and a second space 165b positioned in the rear. A card can be accommodated in both the first space 165a and the second space 165b. The lower surface of the first space 165a and the second space 165b is a rectangular opening able to expose the electrode pads on the card. The same type of card, for example a nanoSIM card, or different types of cards, for example a nanoSIM card and a microSD® card, can be accommodated in the first space 165a and the second space 165b. A card can be accommodated in either the first space 165a or the second space 165b with the other space remaining empty.

Figure 2:
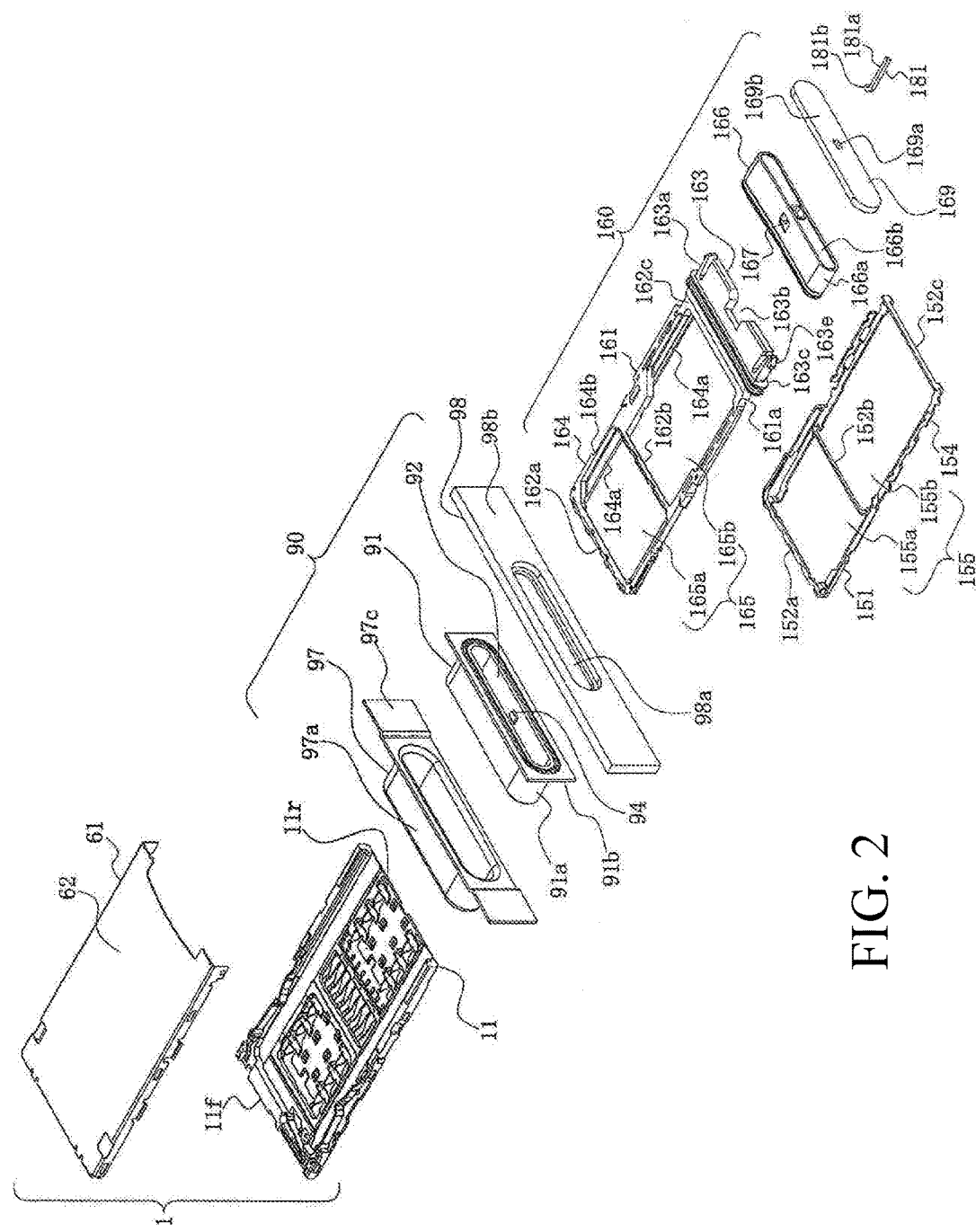
FIG. 2 is an exploded perspective view of the card connector set in the embodiment of the present disclosure.

The frame portion 161 is a member including a metal portion 151 integrally formed by stamping and bending a metal panel, and a resin portion 161a made of an insulating resin covering and becoming integrated with a section of the metal portion 151 using a molding technique such as insert molding or overmolding. In FIG. 2, it is unclear whether the metal portion 151 and the resin portion 161a are separate members or interconnected members. However, this depiction is appropriate. In the present embodiment, the frame portion 161 is provided by covering and integrating at least the periphery of the metal portion 151 with the resin portion 161a molded using a molding technique such as inset molding or overmolding.

The metal portion 151 is a frame member with a substantially rectangular profile surrounding the four sides of a space 155, the space 155 divided into a first space 155a and a second space 155b corresponding to the first space 165a and the second space 165b of the frame portion 161. The metal portion 151 includes a front frame portion 152a, a middle frame portion 152b, and a rear frame portion 152c extending parallel to each other in the transverse direction, and side frame portions 154 extending parallel to each other in the longitudinal direction and connected to both ends of the front frame portion 152a, the middle frame portion 152b, and the rear frame portion 152c.

The frame portion 161 includes a front frame portion 162a, a middle frame portion 162b, a rear frame portion 162c, and side frame portions 164 corresponding to the front frame portion 152a, the middle frame portion 152b, the rear frame portion 152c, and the side frame portions 154 of the metal portion 151, and are integrally molded by covering at least the peripheral portions of the front frame portion 152a, the middle frame portion 152b, the rear frame portion 152c, and the side frame portions 154 with a resin. Eaves portions 164a are formed at various locations on the inner surfaces of the side frame portions 164 to support the bottom surface of the card housed inside the first space 165a and the second space 165b. A holding recessed portion 164b is formed on the bottom side surface of each side frame portion 164 to hold and secure the card tray 160 inserted into the card connector 1.

The card tray 160 includes a connecting base portion 163 integrally connected with the rear frame portion 162c and extending to the rear, a movable connecting portion 166 mounted slidably on the connecting base portion 163, and a decorative flange panel 169 fixed to the rear end of the rear end panel 166b of the movable connecting portion 166. The flange panel 169, when viewed from the rear, has a larger surface area than the rear end panel 166b of the movable connecting portion 166, the outer peripheral edges extend outward from the outer peripheral edges of the rear end panel 166b, and the rear surface 169b functions as the rear surface of the movable connecting portion 166. The flange panel 169 can be omitted. Also, the distance that the movable connecting portion 166 can slide along the connecting base portion 163 is approximately 1.0 mm, but this distance can vary somewhat.

The connecting base portion 163 is a panel-like member with a rectangular profile integrally formed with the frame portion 161 and extending in the transverse direction of the card tray 160. A cantilevered connecting piece 163a is formed on both the left and the right sides which extend to the rear. The connecting pieces 163a are slender rod-shaped or tongue-shaped members connected at the base end to the main body of the connecting base portion 163 and separate from the main body of the connecting base portion 163 at least near the free end (rear end). These can be elastically displaced in the transverse direction of the card tray 160. An engaged protrusion 163e is formed on the free end of each connecting piece 163a and extends outward in the transverse direction of the card tray 160. The engaged protrusions 163a engage an engaging protrusion 166d on the movable connecting portion 166.

The connecting base portion 163 also includes a recessed portion 163b formed in the central portion in the transverse direction of the card tray 160. The recessed portion 163e is formed so as to extend forward from the rear end surface of the connecting base portion 163 and to accommodate a forward protruding portion 168 on the movable connecting portion 166.

The connecting base portion 163 includes a flange portion 163c formed near the section connected to the rear frame portion 152c. The flange 163c is formed continuously so as to surround the entire periphery of the main body of the connecting base portion 163. When viewed from the rear, the outer peripheral edge protrudes outward from the outer peripheral edge of the main body of the connecting base portion 163. A seal accommodating first groove 163d is formed in the outer peripheral surface of the flange portion 163c to serve as groove-like first sealed portion. The seal accommodating first groove 163d is formed so as to extend inward from the outer peripheral surface of the flange portion 163c, and is formed continuously so as to surround the entire outer peripheral surface of the flange portion 163c.

A seal first protruding portion 93a, serving as the first sealing portion, on the tray sealing portion 91, serving as the sealing portion of the outer member 90, is inserted into and engaged by the seal accommodating first groove 163d.

The movable connecting portion 166 is a flat, cylindrical member integrally formed using an insulating resin, and includes a cylindrical portion 166a corresponding to the side walls of the cylinder, and a rear end panel 166b sealing the rear end of the cylinder. The front end of the cylinder is open. The connecting base surface 163 is slidably connected to the movable connecting portion 166 and inserted into the cylindrical portion 166a from the front end. An engaging protrusion 166d is formed on both the left and the right side surfaces at the front end of the cylindrical portion 166a and each protrudes inward in the transverse direction of the card tray 160. The engaging protrusions 166d engage engaged protrusions 163e on the connecting base portion 163.

A seal accommodating second groove 166c is formed on the outer peripheral surface at the front end of the cylindrical portion 166a and serves as a groove-shaped second sealed portion. The seal accommodating second groove 166c is formed so as to extend inward from the outer peripheral surface of the cylindrical portion 166a and is formed continuously around the entire outer peripheral surface of the cylindrical portion 166a. A seal second protruding portion 93b, serving as the second sealing portion, on the tray sealing portion 91, serving as the sealing portion of the outer member 90, is inserted into and engaged by the seal accommodating second groove 166c.

The movable connecting portion 166 also includes a forward protruding portion 168 extending forward from the central portion of the rear end panel 166b in the transverse direction of the card tray 160. The upper end and the lower end of the forward protruding portion 168 is integrally connected to the upper inner surface and the lower inner surface of the cylindrical portion 166a. Internal cavities 167 are formed inside the forward protruding portion 168 to serve as an ejection auxiliary member engaging portion for receiving and engaging the inserted leading end portion of an operation assisting member 181 serving as an ejection auxiliary member. The internal cavities 167 include a first cavity 167a open at the rear end to the rear end surface of the rear end panel 166b and extending forward from the rear end, and a second cavity 167b extending vertically through the front end of the first cavity 167a and open on the upper outer surface and lower outer surface of the cylindrical portion 166a. The first cavity 167a is the portion into which the leading end portion of the operation assisting member 181 is inserted, but the cross-sectional profile has a shorter dimension in the vertical direction than in the transverse direction. Therefore, as shown in the drawing, the orientation of the operation assisting member 181 is controlled so that the leading end of the hook portion 181b formed at the leading end of the main body portion 181a is horizontal. In this way, the leading end portion of the operation supporting member 181 can be inserted into the first cavity 167a. When the hook portion 181b reaches the second cavity 167b, the orientation of the operation assisting member 181 is rotated 90 degrees around the axis of the first cavity 167a so that the hook portion 181b can engage the rear end surface of the second cavity 167b.

The front end surface of the second cavity 167b functions as a pressure receiving portion 168a on the forward protruding portion 168, which engages the pressure imparting portion 94 of the tray sealing portion 91 so that pressure can be imparted by the pressure imparting portion 94 in the forward direction. More specifically, both vertical ends of the pressure receiving portion 168a come into contact with and presses against the forward inclined surface 94a of the pressure imparting portion 94. The reaction force from the elastic pressure imparting portion 94 is imparted to both vertical ends of the pressure receiving portion 168a from the forward inclined surface 94a, and both vertical ends receive biasing force which displaces them along the forward inclined surface 94a and biases them in the forward direction.

The flange panel 169 is a flat, panel-like member made of resin and metal, and is mounted on the rear surface of the rear end panel 166b of the movable connecting portion 166 using means such as an adhesive. A through-hole 169a is formed in the flange panel 169 communicating with the first cavity 167a open at the rear end to the rear end surface of the rear end panel 166b so the operation assisting member 181 can be inserted. The cross-sectional profile of the through-hole 169a is similar to the cross-sectional profile of the first cavity 167a, and the orientation of the operation assisting member 181 is controlled so that the leading end of the hook portion 181b formed at the leading end of the main body portion 181a is horizontal. In this way, the leading end portion of the operation assisting member 181 can be inserted into the through-hole 169a. The external shape and external dimensions of the flange panel 169 are similar to the shape and dimensions of the insertion slot 98a formed in the insertion slot frame member 98 of the outer member 90, and the flange panel 169 can be fitted into the insertion slot 98a.

The insertion slot frame portion 98 is a portion of the case for the electronic device in which the card connector 1 is mounted, but is a separate component from the card connector 1. It is fixed so that there is no change in the relative position with respect to the card connector 1 via a position fixing member (not shown). The position fixing member is the case of the electronic device in which the circuit board mounted to the card connector 1 and the card tray 160 are attached, and the insertion slot frame member 98 is fixed directly or indirectly by the position fixing member so that it does not change its relative positional relationship to the card connector 1. In the following explanation, the insertion slot frame member 98 is considered to be a portion of the position fixing member and a portion of the case for the electronic device. Also, the outer surface 98b of the insertion slot frame member 98 functions as the outer surface of the outer member 90 and the outer surface of the case for the electronic device.

The insertion slot frame member 98 includes an insertion slot 98a formed so as to pass though the frame member in the thickness direction. The insertion slot 98a has a shape and dimensions enabling the card tray 160 to be inserted and enabling the flange panel 169 of the card tray 160 to be fitted into the slot.

In the outer member 90, the tray sealing portion 91 is mounted by a mounting member 97 on the inner surface, that is, the front surface of the insertion slot frame member 98. The tray sealing portion 91 is a flat, cylindrical member integrally molded using an elastic resin such as a rubber, and includes a cylindrical portion 91a corresponding to the side walls of the cylinder, and a flange portion 91b connected to the rear end of the cylinder and extending outward from the cylinder. The inside of the cylinder is a flat and cylindrical insertion passage 92 extending in the longitudinal direction, and the card tray 160 is inserted into the card connector 1 via the insertion passage 92. Both ends of the insertion passage 92 are open. The flange portion 91b is a panel-like member having a rectangular external profile.

A ridge is formed on the inner peripheral surface at the front end of the cylindrical portion 91a, that is, on the inner peripheral surface of the insertion passage 92, and the ridge protrudes from the inner circumferential surface. A seal protruding portion 93 is formed, which is a ridge portion formed continuously around the inner peripheral surface. There may be one seal protruding portion 93, but more than one is preferred. In the example shown in the drawing, there are two protruding ridges, namely, a seal first protruding portion 93a and a seal second protruding portion 93b. However, there may be three or more protruding ridges. The seal first protruding portion 93a is inserted into the seal accommodating first groove 163d formed in the connecting base portion 163. In this way, a seal is established between the inner peripheral surface of the insertion passage 92 and the outer peripheral surface of the connecting base portion 163. The seal second protruding portion 93b is inserted into the seal accommodating second groove 166c formed in the movable connecting portion 166. In this way, a seal is established between the inner peripheral surface of the insertion passage 92 and the outer peripheral surface of the movable connecting portion 166.

A pressure imparting portion 94 is formed in the upper inner surface and the lower inner surface of the central portion of the inner peripheral surface of the insertion passage 92 in the transverse direction, and is a protruding portion formed so as to extend from the upper inner surface and the lower inner surface. The pressure imparting portion 94 includes a forward inclined surface 94a formed in the forward direction, and the forward inclined surface 94a biases the movable connecting portion 166 forward by contacting the upper and lower ends of the pressure receiving portion 168a on the forward protruding portion 168 of the movable connecting portion 166.

The mounting member 97 includes a cylindrical portion 97a, which is a flat, cylindrical member made of metal or resin, corresponding to the inner walls of the cylinder, and a fixed flange portion 97c connected to the rear end of the cylinder and extending outward from the cylinder. Both ends of the cylinder are open. A stopping flange portion 97b is formed at the front end which extends into the cylinder. The cylindrical portion 91a of the tray sealing portion 91 is inserted into the cylindrical portion 97a from the rear end and held by the cylindrical portion 97a. The stopping flange portion 97b has an inner end shape similar to that of the cylindrical portion 97a, but the dimensions of the inner end are smaller than the outer peripheral dimensions of the cylindrical portion 91a of the tray sealing portion 91, and the inner peripheral dimensions of the cylindrical portion 91a are larger than the inner peripheral dimensions of the cylindrical portion 91a. This allows the card tray 160 to pass through while preventing displacement of the cylindrical portion 91a of the tray sealing portion 91 in the forward direction.

Figure 5A:
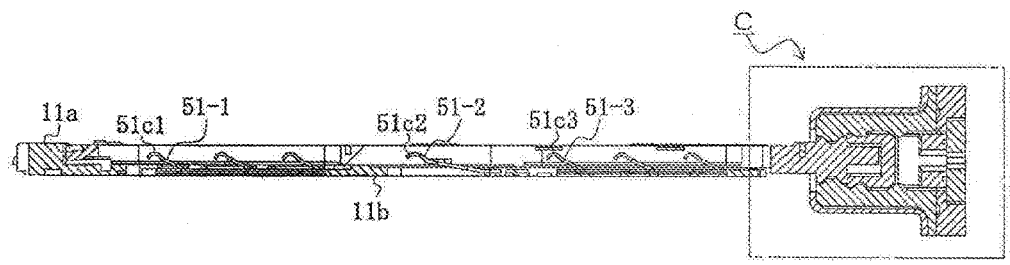
Figure 5B:
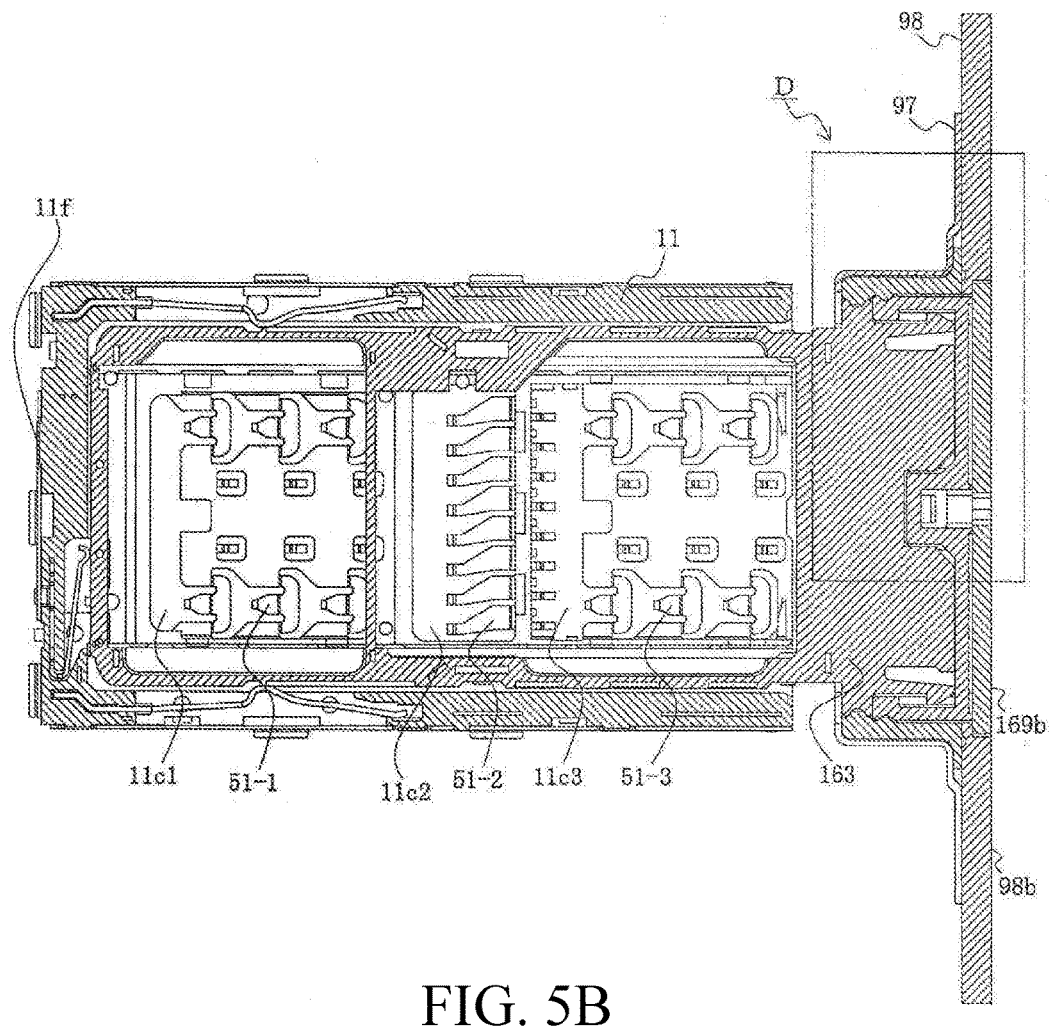

The fixed flange portion 97c is a panel-shaped member with a rectangular external profile. In the example shown in the drawing, the vertical dimensions (the vertical dimensions in FIG. 5A) are similar to those of the flange portion 91b of the tray sealing portion 91. However, the transverse dimensions (the vertical dimensions in FIG. 5B) are greater than those of the flange portion 91b of the tray sealing portion 91. The fixed flange portion 97c presses the flange portion 91b of the tray sealing portion 91 into the front surface of the insertion slot frame member 98 from the front when fixed to the front surface of the insertion slot frame member 98 using means such as an adhesive or screws. This mounts the tray sealing portion 91 on the insertion slot frame portion 98.

Figure 3A:
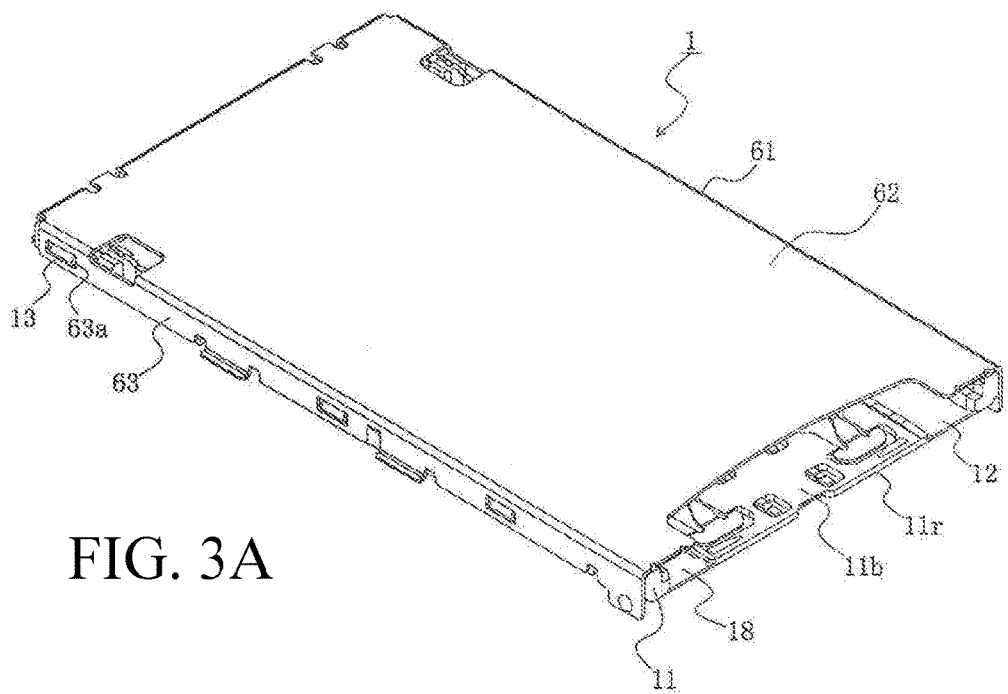
Figure 3B:
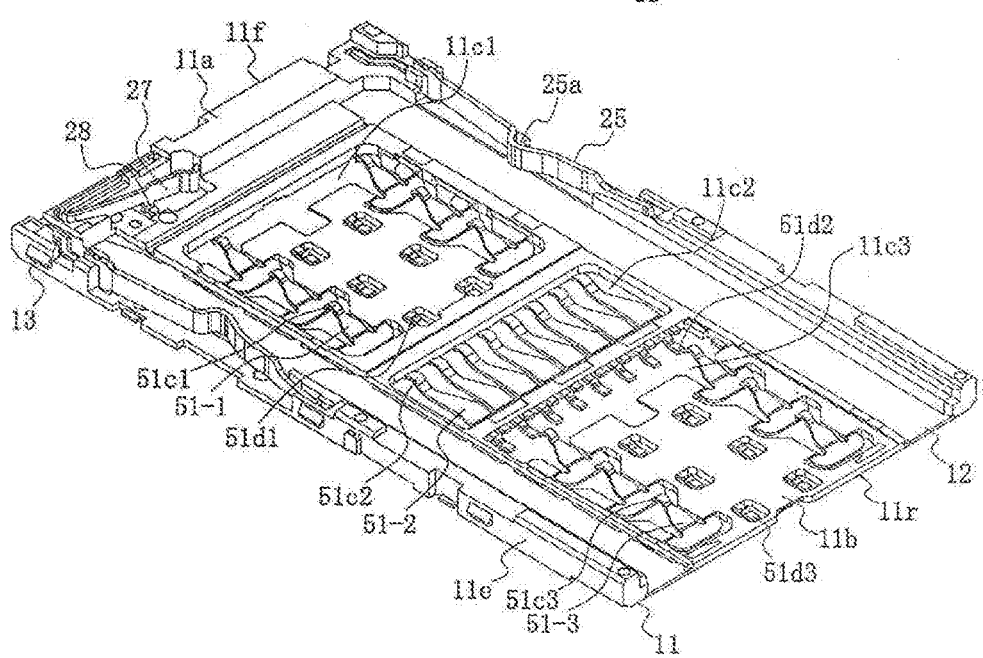

In the present embodiment, the card connector 1 has a housing 11 integrally molded from an insulating material such as a synthetic resin, and a shell 61 or cover member formed integrally by punching and bending a conductive metal sheet which is attached to the upper side of the housing 11. The shell 61 has a substantially rectangular ceiling panel portion 62 and side panel portions 63 erected on the side edges of the ceiling panel portion 62, and covers the housing 11 and at least some of the upper portion of the card tray 160 inserted into the housing 11 and the card connector 1. A plurality of locking openings 63a are formed in the side panel portions 63. When the shell 61 is attached to the top of the housing 11, the locking openings 63a engage locking protrusions 13 formed on the outer surfaces of the side wall portions 11e of the housing 11 to fix the shell 61 to the housing 11. The card connector 1 has a substantially parallelepiped shape, and is mounted on an electronic device. A card tray 160 is inserted into the insertion slot 18 in the rear (below right in FIG. 3A). More specifically, the card tray 160 is inserted into the card insertion space between the housing 11 and the shell 61.

The housing 11 includes primary terminals 51-1, secondary terminals 51-2, tertiary terminals 51-3, and a lower shell 12 integrally formed by stamping and bending a metal panel. This substantially panel-like member is integrally molded using a molding technique such as insert molding or overmolding with an insulating resin which covers and becomes integrated with at least a portion of the periphery of the primary terminals 51-1, secondary terminals 51-2, tertiary terminals 51-3, and the lower shell 12. The lower shell 12 is a frame member for reinforcing the housing 11, and is preferably formed from the same material as the primary terminals 51-1, secondary terminals 51-2 and/or tertiary terminals 51-3, but is electrically insulated from the primary terminals 51-1, the secondary terminals 51-2, and the tertiary terminals 51-3.

The housing 11 also includes a bottom wall portion 11b serving as the substantially rectangular, panel-like terminal holding portion, an inner wall portion 11a thicker than the bottom wall portion 11b which extends in the transverse direction of the housing 11 along the front end portion 11f in the insertion direction (longitudinal direction) of the card tray 160 in the housing 11, and a pair of side wall portions 11e thicker than the bottom wall portion 11b extending in the insertion direction of the housing 11 along both side edges. The lower surfaces of the inner wall portion 11a and the side wall portions 11e are flush with the lower surface of the bottom wall portion 11b, and the upper surfaces are above the upper surface of the bottom wall portion 11b. The end portion of the housing 11 in the insertion direction of the card tray 160 is referred to as the rear end portion 11r.

Here, the bottom wall portion 11b includes a primary terminal holding recessed portion 11c1, a secondary terminal holding recessed portion 11c2, and a tertiary terminal holding recessed portion 11c3 for holding the exposed portions of the primary terminals 51-1, secondary terminals 51-2, and tertiary terminals 51-3. The primary terminal holding recessed portion 11c1, secondary terminal holding recessed portion 11c2, and tertiary terminal holding recessed portion 11c3 are openings which pass through the bottom wall portion 11b in the thickness direction.

The primary terminals 51-1 and tertiary terminals 51-3 are arranged side by side to form rows extending in the longitudinal direction of the housing 11. In the example shown in the drawing, there are two rows of three. At least a portion of each primary terminal 51-1 and tertiary terminal 51-3 is embedded in the bottom wall portion 11b, and at least the contact portion 51c1, 51c3 is exposed inside the primary terminal holding recessed portion 11c1 and the tertiary terminal holding recessed portion 11c3. Solder tail portions 51d1, 51d3 to be soldered are also exposed on the bottom surface of the bottom wall portion 11b. The contact portions 51c1 and 51c3 are biased upwards by the spring action of the arm portions of the primary terminals 51-1 and the tertiary terminals 51-3, and come into contact with the corresponding electrode pads exposed on the bottom surface of the nanoSIM cards housed inside the first cavity 165a and the second cavity 165b of the frame portion 161 of the card tray 160 held inside the card connector 1. The solder tails 51d1 and 51d3 are connected electrically by solder to signals lines, contact pads, or terminals formed on the board (not shown).

The secondary terminals 51-2 are arranged in a single row extending in the longitudinal direction of the housing 11. At least a portion of each secondary terminal 51-2 is embedded in the bottom wall portion 11b, and at least the contact portion 51c2 is exposed inside a secondary terminal holding recessed portion 11c2. The solder tail portions 51d2 to be soldered are exposed on the bottom surface of the bottom wall portion 11b. The contact portions 51c2 are biased upwards by the spring action of the arm portions of the secondary terminals 51-2, and come into contact with the corresponding electrode pads on the MicroSD® card housed inside the second space 165b of the frame portion 161 of the card tray 160 held inside the card connector 1. Each solder tail portion 51d2 is connected electrically by solder to a signal line, contact pad, or terminal formed on a board.

The number and arrangement of the primary terminals 51-1, the secondary terminals 51-2, and the tertiary terminals 51-3 matches the electrode pads on the cards. The primary terminals 51-1, secondary terminals 51-2, the tertiary terminals 51-3, the primary terminal holding recessed portions 11c1, the secondary terminal holding recessed portion 11c2, the tertiary terminal holding recessed portions 11c3, the contact portions 51c1, 51c2, 51c3, and the solder tail portions 51d1, 51d2, 51d3 may be referred to collectively in the following explanation as the terminals 51, terminal holding recessed portions 11c, contact portions 51c, and solder tail portions 51d.

The lower shell 12 is exposed between the bottom wall portion 11b and the left and right side wall portions 11e. A holding spring member 25 is formed on the inner side surface of each side wall portion 11e as a holding spring portion to hold and secure the frame portion 161 of the card tray 160. Each holding spring member 25 is a band-shaped member extending in the longitudinal direction, and has a holding protrusion 25a extending inward near the center in the transverse direction of the housing 11. Each holding protrusion 25a engages a holding recessed portion 164b on the frame portion 161, and this holds and secures the frame portion 161 of the card tray 160 inserted into the card connector 1.

The housing 11 includes a movable member 27 and a fixed member 28 for a detection switch used to detect whether the frame portion 161 of the card tray 160 inserted into the card connector 1 has reached a predetermined position inside the card connector 1 (the position at which the frame portion 161 is held by the holding spring members 25 and the contact portions 51c of the terminals 51 are in contact with the corresponding electrode pads on the cards when cards are housed inside the frame portion 161). When the frame portion 161 of the card tray 160 has not reached the predetermined position, the movable member 27 and the fixed member 28 are in contact, and the detection switch is electrified or turned ON. However, when the frame portion 161 of the card tray 160 reaches the predetermined position, the movable member 27 presses against the front frame portion 162a of the frame portion 161, and the movable member 27 is separated from the fixed member 28. Because this de-electrifies or turns the detection switch OFF, it is determined that the frame portion 161 has reached the predetermined position.

The following is an explanation of the operations performed to pull out a card tray 160 from a card connector 1 with this configuration.

Here, the card tray 160, as shown in FIG. 4, FIG. 5A, FIG. 5B, FIG. 6A and FIG. 6B, has been inserted into the card connector 1, and the frame portion 161 is at a predetermined portion inside the card connector 1. For the sake of convenience in the explanation, there are no cards housed inside the spaces 165 of the card tray 160.

When the card tray 160 has been inserted into the card connector 1, the holding protrusions 25a on the holding spring members 25 of the housing 11 engage the holding recessed portions 164b on the frame portion 161. In this way, the frame portion 161 is held stably in the predetermined positions. Also, the seal accommodating first groove 63d formed on the outer peripheral surface of the flange portion 163c of the connecting base portion 163 can reliably reach the position of the seal first protruding portion 93a of the tray sealing portion 9, and the seal first protruding portion 93a can be reliably inserted into and engaged with the seal accommodating first groove 163d. In this way, the space between the connecting base portion 163 and the tray sealing portion 91 can be reliably sealed and a tight seal can be maintained.

Figure 6A:
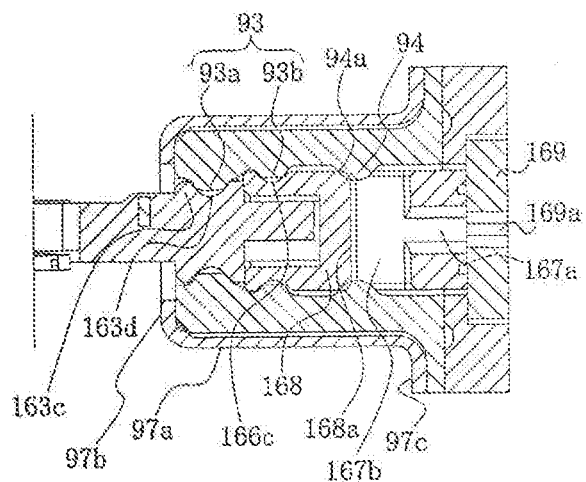
Figure 6B:
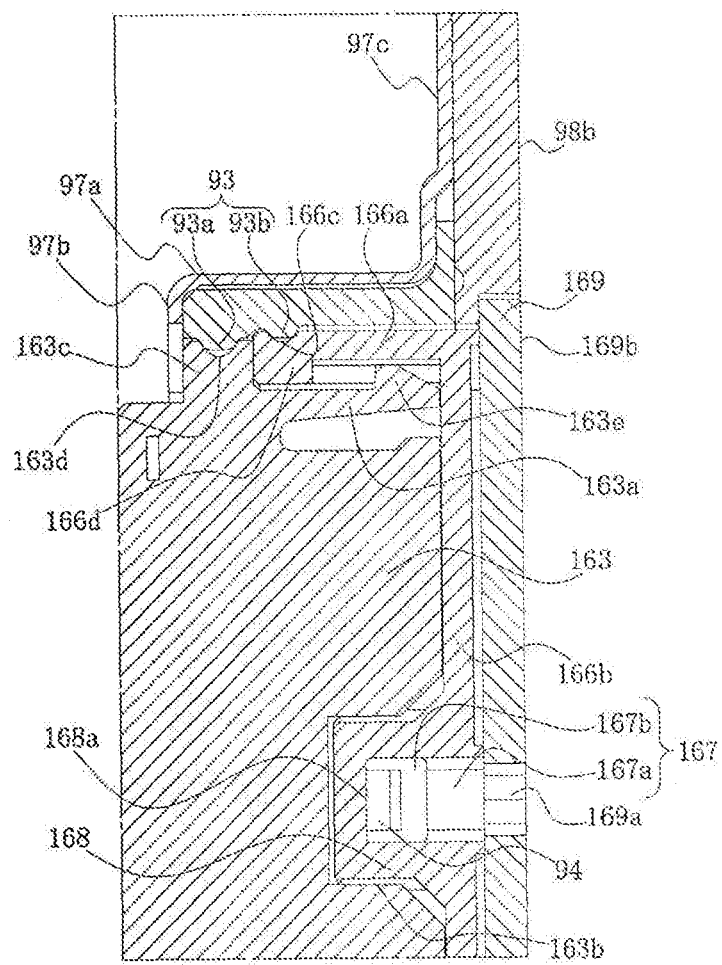

The movable connecting portion 166 is at the most forward position relative to the connecting base portion 163 and, as shown in FIG. 6B, the front end of the cylindrical portion 166a (the front end of the engaging protrusion 166d) is close to or comes into contact with the rear end of the flange portion 163c. The flange panel 169 mounted on the rear end panel 166b of the movable connecting portion 166 is inserted into the insertion slot 98a in the insertion slot frame member 98, and the rear surface 169b of the flange panel 169 is flush with the outer surface 98b of the insertion slot frame member 98.

Also, the vertical ends of the pressure receiving portion 168a on the forward protruding portion 168 of the movable connecting portion 166 comes into contact with the forward inclined surface 94a of the pressure imparting portion 94 of the tray sealing portion 91, and receives biasing force in the forward direction along the forward inclined surface 94a. The biasing force received by the pressure receiving portion 168a in the forward direction advances the movable connecting portion 166 towards the most advanced position relative to the insertion slot frame member 98 and the tray sealing portion 91 attached to the insertion slot frame member 98. In this way, the flange panel 169 is reliably fitted into the insertion slot 98a of the insertion slot frame portion 98, and the rear surface 169b of the flange panel 169 is substantially flush with the outer surface 98b of the insertion slot frame member 98.

The card connector 1 is fixed via a position fixing member (not shown) so that its position relative to the insertion slot frame member 98, which is a portion of the case of the electronic device, does not change. However, there are sometimes mounting errors when the card connector 1 is fixed, and there are sometimes dimensional errors in the various members. Therefore, an error inevitably occurs from time to time in the distance from the card connector 1 to the insertion slot frame member 98. As a result, when the movable connecting portion 166 is fixed to the frame portion 161 and the frame portion 161 is at the predetermined position inside the card connector 1, the flange panel 169 sometimes does not fit into the insertion slot 98a and the rear surface of the flange panel 169 protrudes to the rear from the outer surface 98b of the insertion slot frame member 98.

However, in the present embodiment, the movable connecting portion 166 is able to slide relative to the connecting base portion 163 of the frame portion 161 and receives biasing force from pressure imparting portion 94 in the forward direction. Therefore, even when there is an error in the distance from the card connector 1 to the insertion slot frame member 98, the movable connecting portion 166 is able to reach the farthest position forward relative to the insertion slot frame member 98, the flange panel 169 can be reliably fitted into the insertion slot 98a, and the rear surface 169b of the flange panel 169 can become reliably flush with the outer surface 98b of the insertion slot frame member 98.

Because, as a result, the external appearance remains unmarred and the gap between the flange panel 169 and the movable connecting portion 166 on the one hand and the insertion slot frame member 98 and the tray sealing portion 91 on the other hand is reduced. This greatly reduces the likelihood of foreign matter such as water and dust penetrating into the card connector 1, and enables a tight seal to be reliably maintained.

The seal accommodating second groove 166c in the movable connecting portion 166 can also reliably reach the position of the seal second protruding portion 93b on the tray sealing portion 91, and the seal second protruding portion 93b can reliably enter and engage the seal accommodating second groove 166c. In this way, the gap between the movable connecting portion 166 and the tray sealing portion 91 can be reliably sealed, and a tight seal can be maintained.

In the present embodiment, the seal first protruding portion 93a enters and engages the seal accommodating first groove 163d, and the seal second protruding portion 93b enters and engages the seal accommodating second groove 166c. Because this occurs at two locations in the insertion direction of the card tray 160, the so-called labyrinth effect can be obtained and a very tight seal can be maintained.

When the card tray 160 is pulled out from the card connector 1, the user manually grasps the operation assisting member 181 to adjust the orientation and position of the operation assisting member 181 to those shown in FIG. 1. More specifically, the leading end of the operation assisting member 181 facing forward is positioned in the actual rear of the through-hole 169a of the flange panel 169 and the leading end of the hook portion 181b formed on the leading end is horizontal.

Figure 8A:
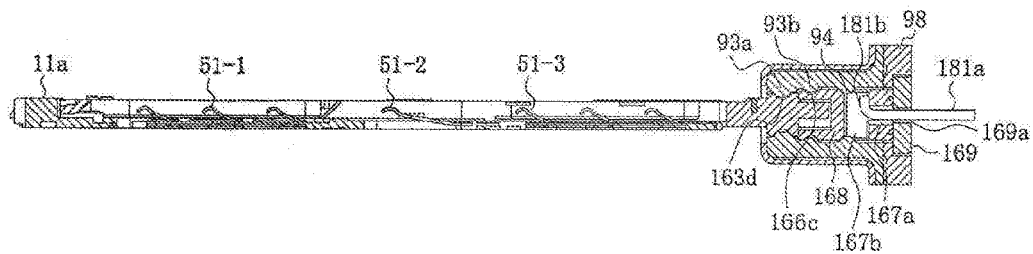
FIGS. 8A and 8B are a pair of perspective views corresponding to FIGS. 5A and 5B showing the first step in the operation of the embodiment of the present disclosure in which the card tray is pulled out from the card connector, FIG. 8A being a cross-sectional view corresponding to FIG. 5A, and FIG. 8B being a cross-sectional view from FIG. 5B.

Next, the user moves the operation assisting member 181 forward, and the leading end is inserted into the through-hole 169a and into the first cavity 167a of the movable connecting portion 166 via the through-hole 169a. When the hook portion 181b formed in the leading end reaches the second cavity 167b of the movable connecting portion 166, the leading end of the hook portion 181b becomes vertical due to the larger vertical dimension of the second cavity 167b. The user rotates the orientation of the operation assisting member 181 by 90 degrees relative to the axis of the first cavity 167a and, as shown in FIG. 8A, engages the hook portion 181b with the rear end surface of the second cavity 167b.

Figure 9:
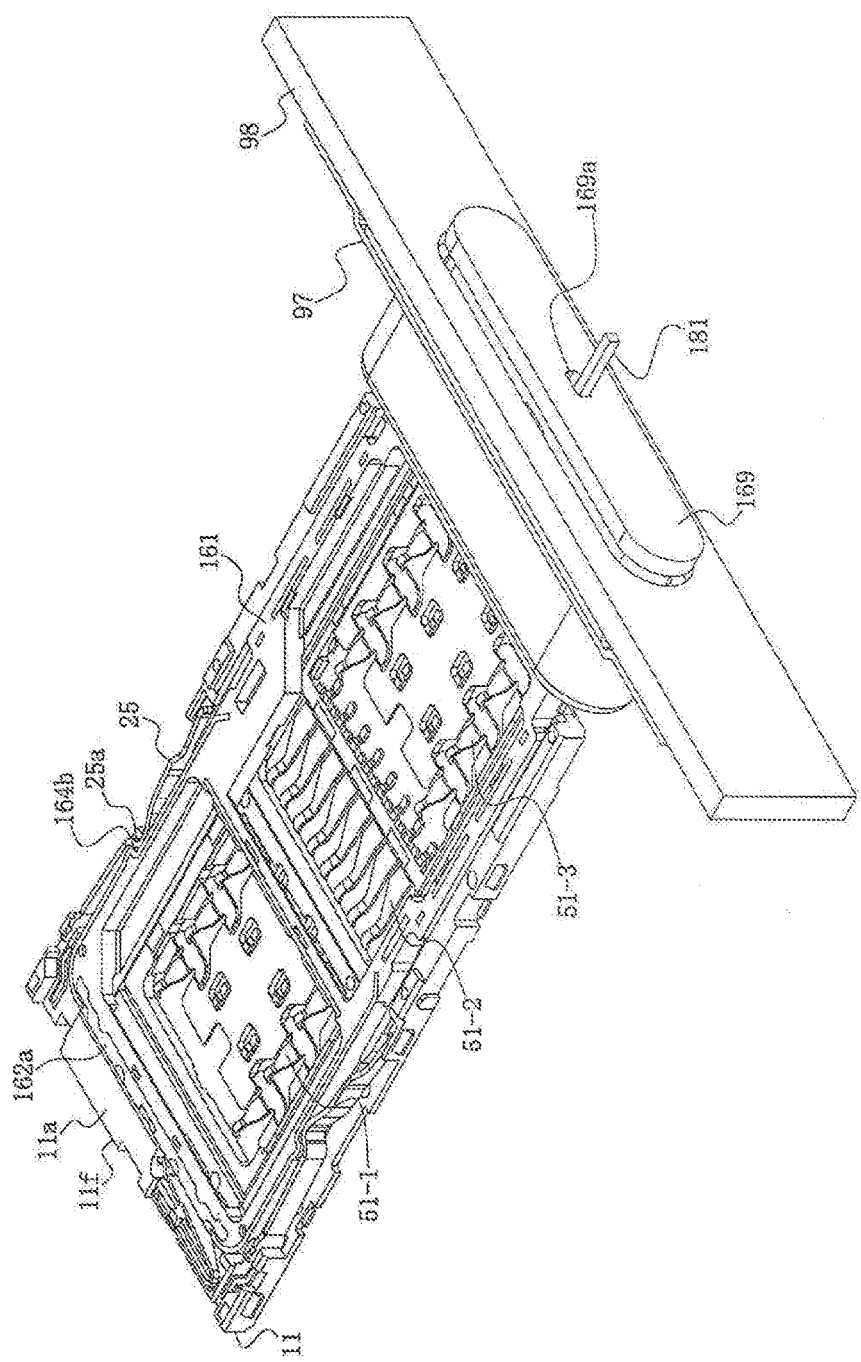
FIG. 9 is a perspective view corresponding to FIG. 4 showing the second step in the operation of the embodiment of the present disclosure in which the card tray is pulled out from the card connector.
Figure 10A:
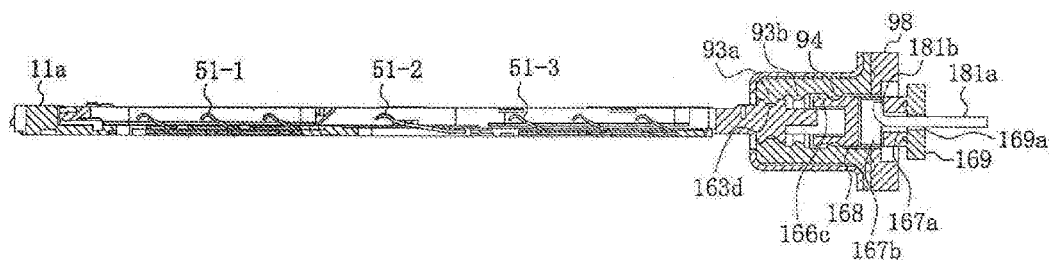
FIGS. 10A and 10B are a pair of perspective views corresponding to FIGS. 5A and 5B showing the second step in the operation of the embodiment of the present disclosure in which the card tray is pulled out from the card connector, FIG. 5A being a cross-sectional view corresponding to FIG. 5A, and FIG. 10B being a cross-sectional view from FIG. 5B.
Figure 10B:
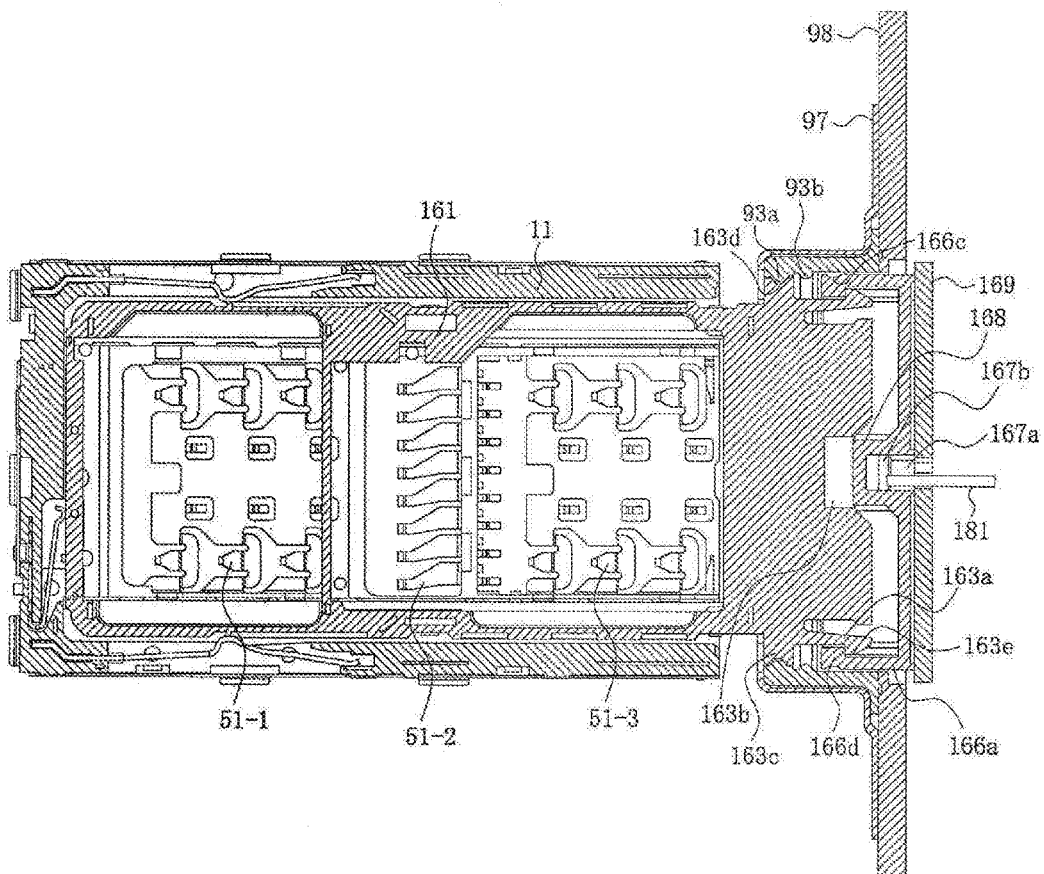

Next, when the user pulls the operation assisting member 181 to the rear, the movable connecting portion 166 and a flange panel 169 is pulled to the rear as shown in FIG. 9 and FIGS. 10A and 10B. More specifically, when the operation assisting member 181 is pulled to the rear with the hook portion 181b engaging the rear end surface of the second cavity 167b, the pressure imparting portion 94 making contact with the vertical ends of the pressure receiving portion 168a in the forward protruding portion 168 of the movable connecting portion 166 is elastically deformed and pushed down, allowing the forward protruding portion 168 to overcome the pressure imparting portion 94 and move to the rear. The seal second protruding portion 93b inserted into and engaging the seal accommodating second groove 166c in the movable connecting portion 166 is also elastically deformed and pushed down to release it from the seal accommodating second groove 166c. This allows the cylindrical portion 166a to move to the rear. Meanwhile, because the connecting base portion 163 inserted into the cylindrical portion 166a is slidably connected to the movable connecting portion 166, it does not move to the rear until the rear end of the engaging protrusion 166d on the cylindrical portion 166a makes contact with the front end of the engaged protrusion 163e. As a result, the frame portion 161 does not move to the rear.

Figure 7:
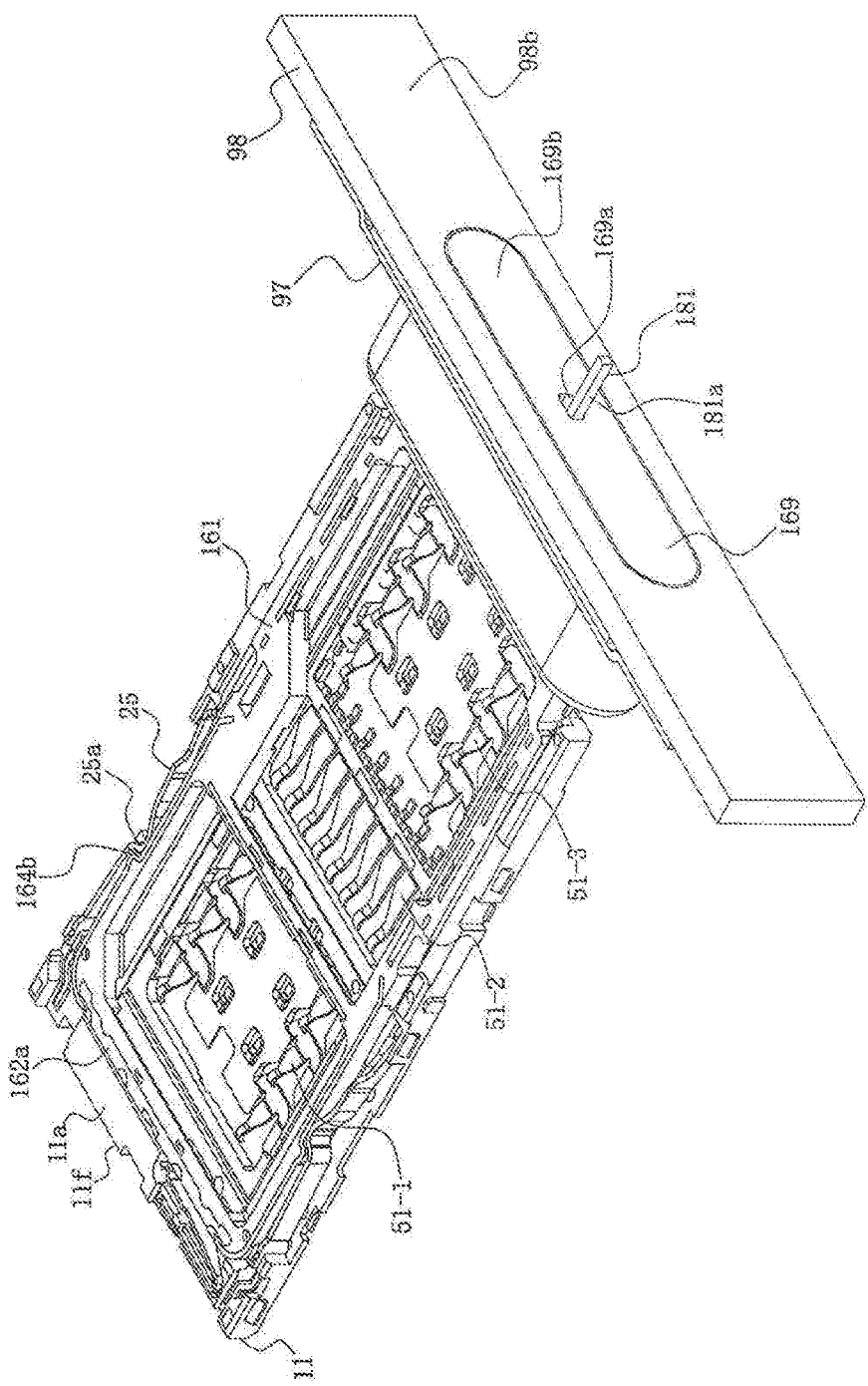
FIG. 7 is a perspective view corresponding to FIG. 4 showing the first step in the operation of the embodiment of the present disclosure in which the card tray is pulled out from the card connector.
Figure 8B:
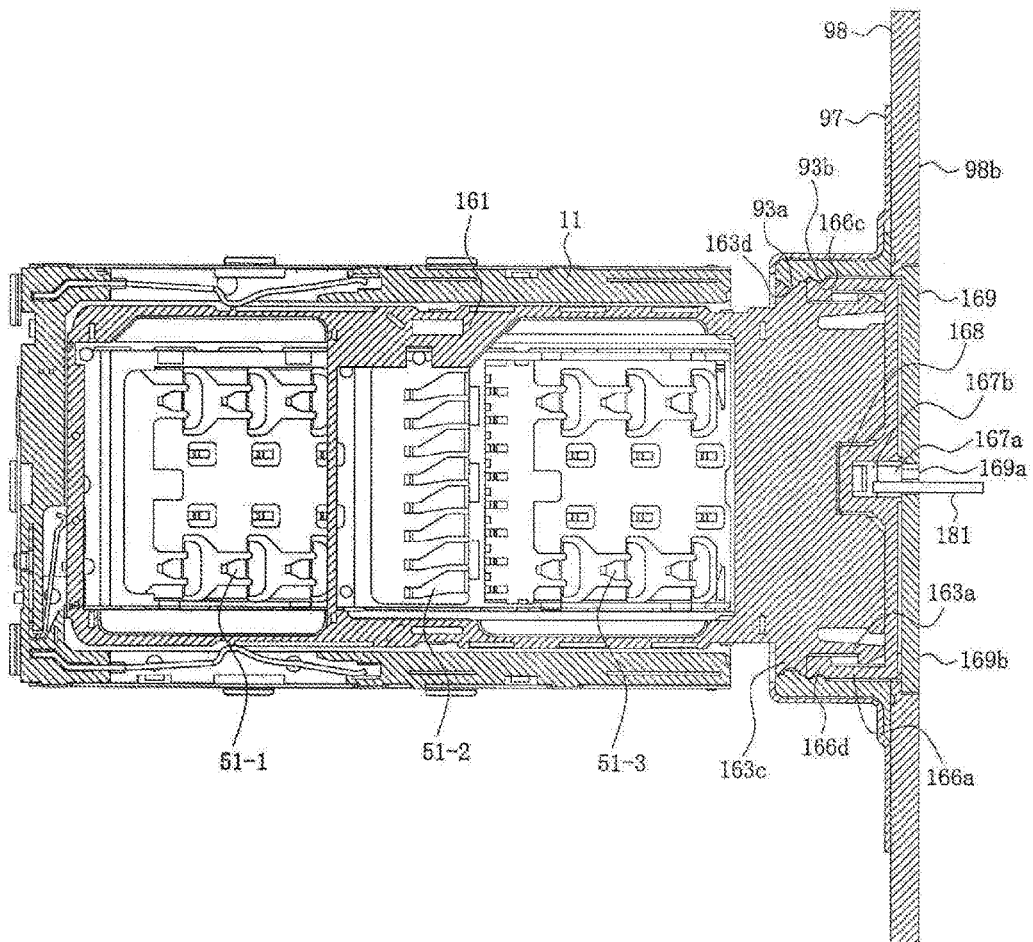

When the user continues to pull the operation assisting member 181 to the rear and the rear end of the engaging protrusion 166d on the cylindrical portion 166a comes into contact with the front end of the engaged protrusion 163e as shown in FIG. 10B, the force pulling the components to the rear is transmitted to the connecting base portion 163 and the frame member 161, and the connecting base portion 163 and the frame member 161 also move to the rear. The engaging protrusion 166d coming into contact with the engaged protrusion 163e moves the movable connecting portion 166 approximately 1.0 mm to the rear from its forward most position relative to the tray sealing portion 91 as shown in FIG. 7 and FIGS. 8A and 8B. In FIG. 9 and FIGS. 10A and 10B, the rear surface of the flange panel 169 is positioned approximately 1.0 mm to the rear from the rear surface of the insertion slot frame member 98.

Figure 11:
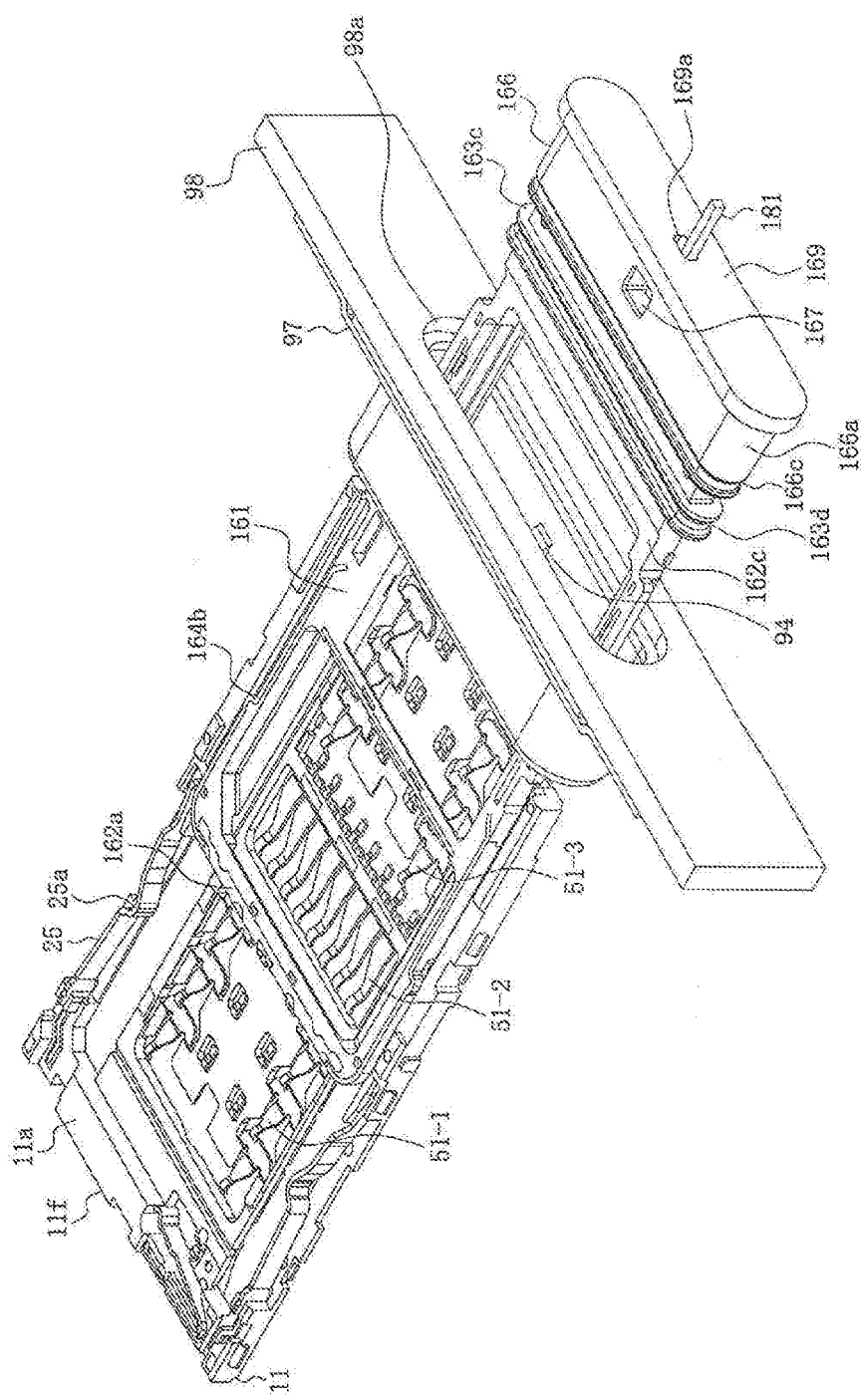
FIG. 11 is a perspective view corresponding to FIG. 4 showing the third step in the operation of the embodiment of the present disclosure in which the card tray is pulled out from the card connector.
Figure 12A:
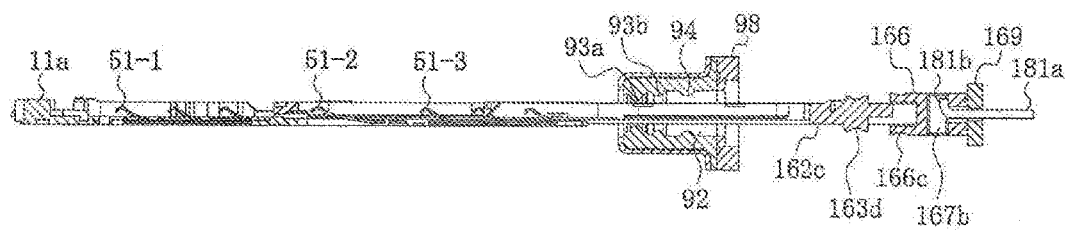
FIGS. 12A and 12B are a pair of perspective views corresponding to FIGS. 5A and 5B showing the third step in the operation of the embodiment of the present disclosure in which the card tray is pulled out from the card connector, FIG. 12A being a cross-sectional view corresponding to FIG. 5A, and FIG. 12B being a cross-sectional view from FIG. 5B.
Figure 12B:
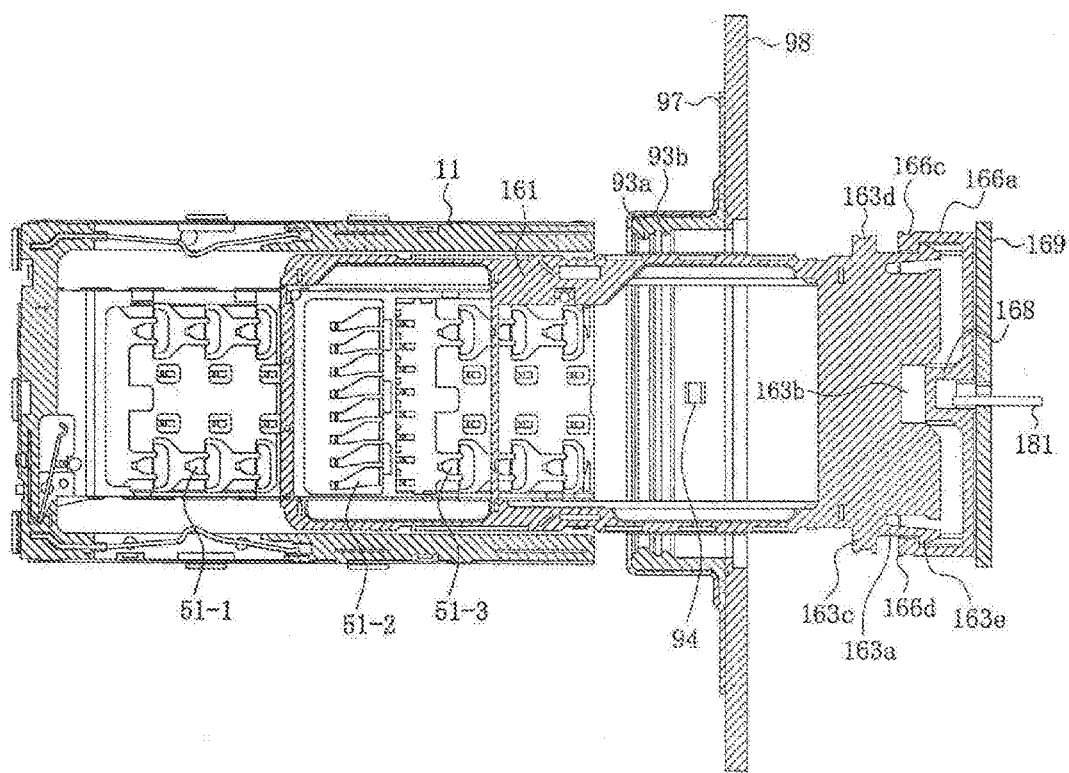

Next, when the user pulls the operation assisting member 181 even further to the rear, the force pulling the components to the rear is transmitted to the frame portion 161 via the movable connecting portion 166 and the connecting base portion 163, and the frame portion 161 is pulled to the rear from the predetermined position as shown in FIG. 11 and FIGS. 12A and 12B. At this time, the holding recessed portions 164b on the frame portion 161 disengage from the holding protruding portions 25a on the holding spring members 25. Despite resistance primarily from the spring action of the elastically deformed holding protruding portions 25a on the holding spring members 25, the pulling force from the user is greater than the resistance. As a result, frame portion 161 moves to the rear against the resistance. The detection switch is turned ON, the retreat of the frame portion 161 from the predetermined position is detected. The seal first protruding portion 93a inserted into and engaging the seal accommodating first groove 163d in the connecting base portion 163 is elastically deformed and pushed down, releasing it from the seal accommodating first groove 163d and allowing the connecting base portion 163 to also move to the rear.

Figure 13:
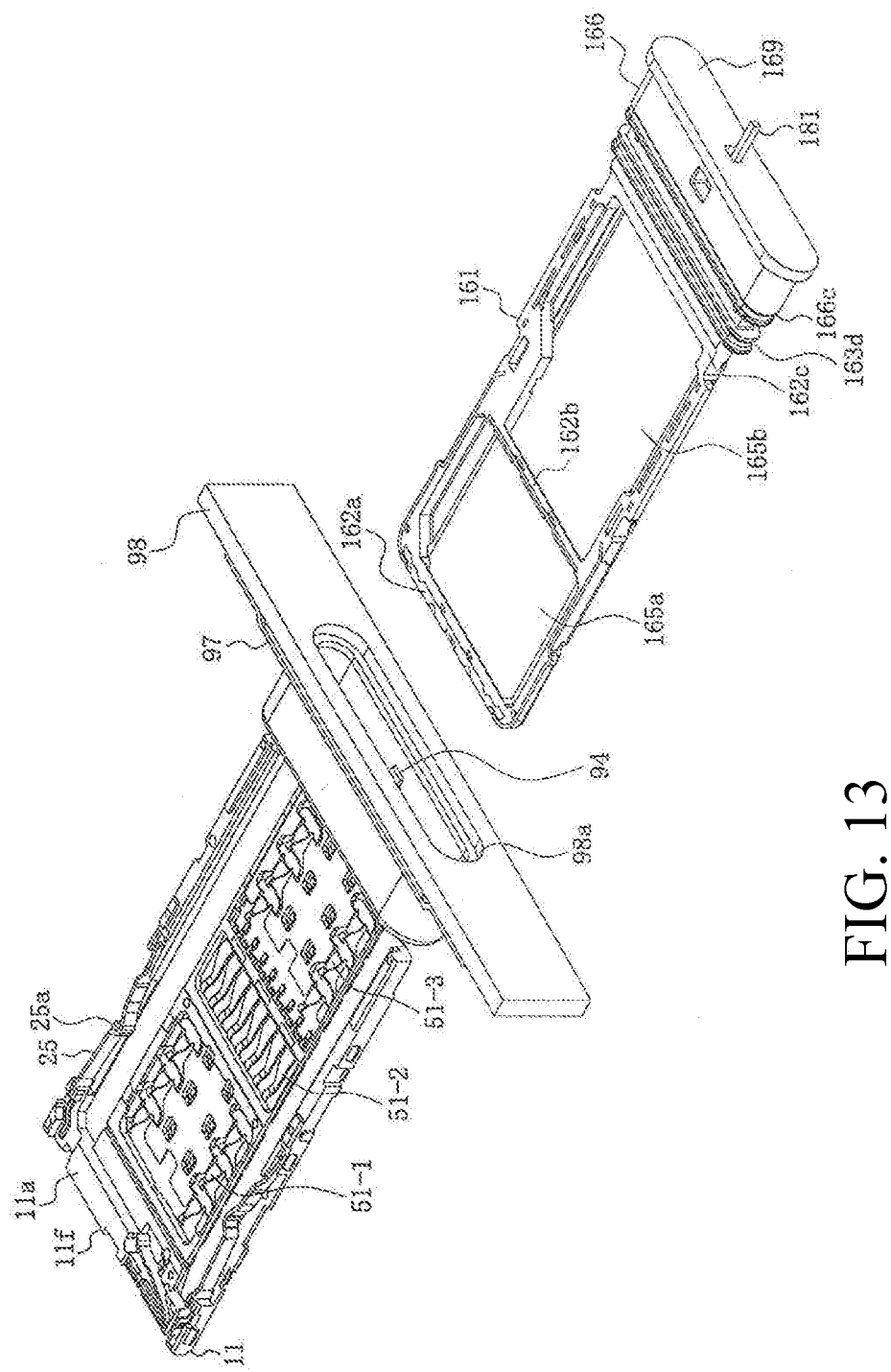
FIG. 13 is a perspective view corresponding to FIG. 4 showing the fourth step in the operation of the embodiment of the present disclosure in which the card tray is pulled out from the card connector.
Figure 14:
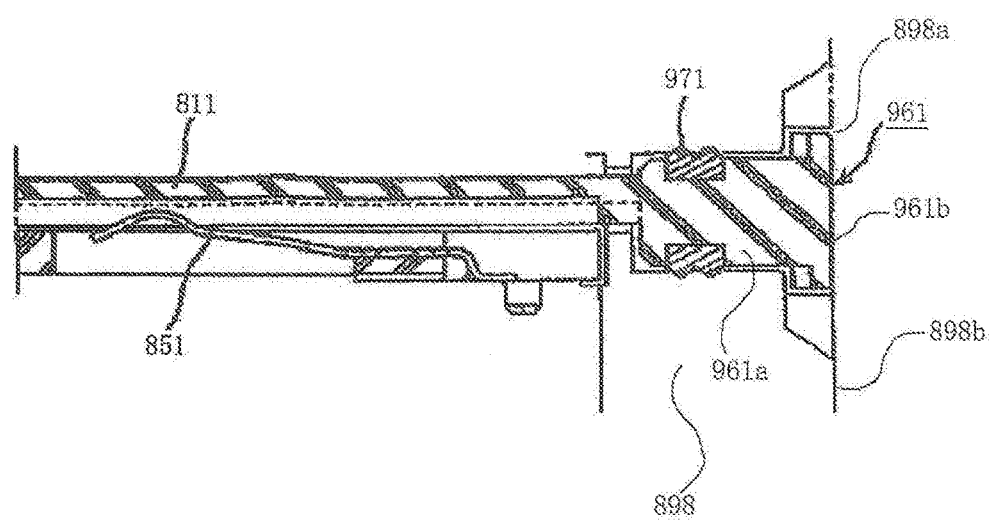
FIG. 14 is a diagram showing a card connector of the prior art.

Finally, the user, as shown in FIG. 13, pulls the entire card tray 160 out from the card connector 1 and away from the insertion slot frame member 98 forming a portion of the case of the electronic device.

The following is an explanation of the operations performed to insert the card tray 160 into the card connector 1.

First, the user manually grasps the card tray 160 and, as shown in FIG. 13, positions the card tray 160 to the rear of the insertion slot 98a in the insertion slot frame member 98. The card tray 160 is then brought closer to the insertion slot 98a and inserted via the insertion slot 18 into the card insertion space formed between the housing 11 and the shell 61 from the card insertion slot 18 in the card connector 1. In the example shown in FIG. 13, the leading end of the operation assisting member 181 is inserted into the through-hole 169a, but the operation assisting member 181 does not have to be used when the card tray 160 is inserted into the card connector 1.

Here, a nanoSIM card can be housed in the first space 165a and the second space 165b in the frame portion 161 of the card tray 160, a nanoSIM card can be housed in the first space 165a and a MicroSD® card can be housed in the second space 165b, or a single nanoSIM card or MicroSD® card can be housed in the first space 165a or the second space 165b. In all of these situations, the card is housed in the space 165 so that the electrode pads on the bottom surface of the card are exposed on the bottom surface of the space 165. The card tray 160 is then inserted with the bottom surface of the card or cards facing downward and the front frame portion 162a facing forward. In the example shown in the drawings, neither of the spaces 165 in the card tray 160 houses a card.

Figure 4:
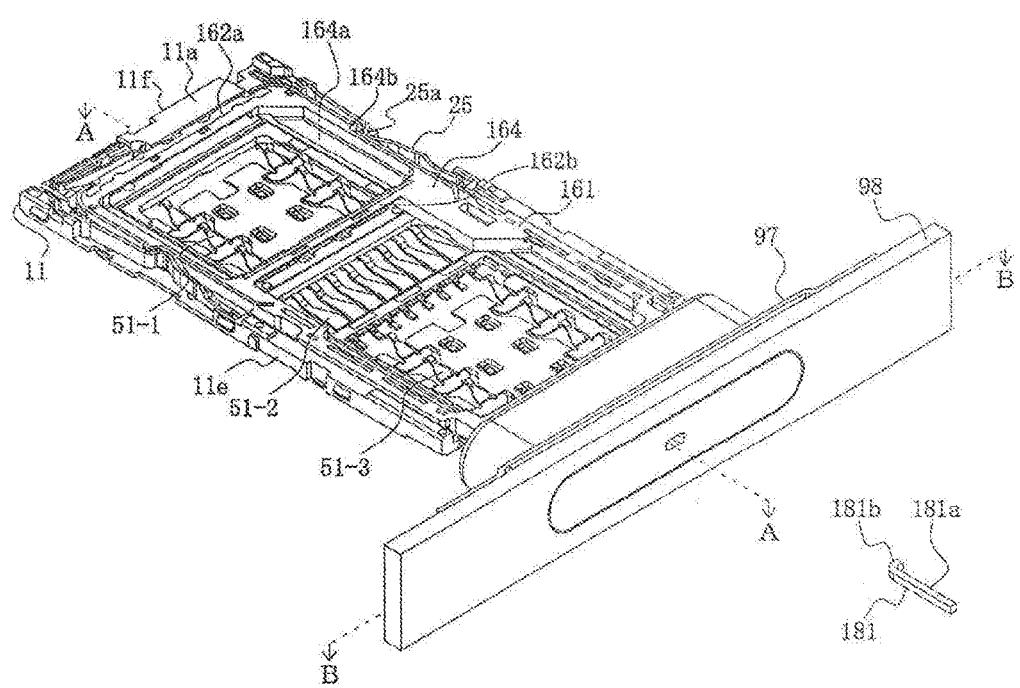
FIG. 4 is an exploded perspective view of the card connector set in the embodiment of the present disclosure with the shell removed from the card connector.

Next, when the user pushes the card tray 160 further in, as shown in FIG. 4 through FIG. 6, the frame portion 161 of the card tray 160 reaches the predetermined position in the card connector 1, and the insertion of the card tray 160 into the card connector 1 is complete.

In the present embodiment, the card tray 160 can be inserted into the card connector 1 via the tray sealing portion 91 of the outer member 90 and can hold the card with electrode pads. The card tray 160 includes a connecting base portion 163 integrally connected to the frame portion 161, and a movable base portion 166 mounted slidably to the connecting base portion 163 in the insertion and ejection directions of the card tray 160. The connecting base portion 163 includes a seal accommodating first groove 163d formed on the outer peripheral surface of the connecting base portion 163 and able to engage a seal first protruding portion 93a in the tray sealing portion 91. The movable connecting portion 166 includes a pressure receiving portion 168a able to engage the pressure imparting portion 94 in the tray sealing portion 91, and the movable connecting portion 166 is biased in the insertion direction and positioned relative to the outer member 90 when the pressure receiving portion 168a engages the pressure imparting portion 94.

Therefore, even when there is an error in the distance from the card connector 1 to the outer member 90, the movable connecting portion 166 can be reliably positioned in relation to the outer member 90, and the gap between the tray sealing portion 91 and the movable connecting portion 166 can be narrowed. This greatly reduces the likelihood of foreign matter such as water and dust penetrating into the card connector 1, and enables a tight seal to be reliably maintained.

When the movable connecting portion 166 is positioned relative to the outer member 90, the rear surface 169b of the flange panel 169 mounted on the movable connecting portion 166 is flush with the outer surface 98b of the insertion slot frame member 98 on the outer member 90. This improves the external appearance of the electronic device in which the card connector 1 is mounted. Because the user cannot catch a finger or anything else in the gap between the rear surface 169b of the flange panel 169 and the outer surface 98b of the insertion slot frame member 98, safety is improved.

The movable connecting portion 166 includes a seal accommodating second groove 166c formed on the outer peripheral surface of the movable connecting portion 166 and able to engage a seal second protruding portion 93b in the tray sealing portion 91. In this way, the gap between the movable connecting portion 166 and the tray sealing portion 91 is reliably sealed and a tight seal can be maintained.

The movable connecting portion 166 includes internal cavities 167 able to engage an operation assisting member 181 and the movable connecting portion 166 can slide in the injection direction when force is applied from the operation assisting member 181 in the ejection direction. Therefore, even when the rear surface 169b of the flange panel 169 mounted on the movable connecting portion 166 is flush with the outer surface 98b of the insertion slot frame member 98 of the outer member 90, the movable connecting portion 166 can be easily slid in the ejection direction.

The movable connecting portion 166 includes an engaging protrusion 166d, and the connecting base portion 163 includes an engaged protrusion 163e. When the engaged protrusion 163e engages the engaging protrusion 166d, the connecting base portion 163 slides with the movable connecting portion 166 in the ejection direction. Therefore, the connecting base portion 163 and the frame portion 161 slide in the ejection direction, and the entire card tray 160 is ejected.

The movable connecting portion 166 includes a cylindrical portion 166a into which the connecting base portion 163 is inserted, the cylindrical portion 166a is inserted into the insertion passage 92 of the tray sealing portion 91, and the space between the inner peripheral surface of the insertion passage 92 and the outer peripheral surfaces of the connecting base portion 163 and the movable connecting portion 166 is sealed. This keeps foreign matter such as water and dust from penetrating into the card connector 1, and enables a tight seal to be maintained.

The present disclosure is not limited to the embodiments described above. Variations based on the spirit of the disclosure are possible, and these do not depart from the scope of the present disclosure.

The present disclosure can be applied to a card holding member and a card connector set.

The invention claimed is:

1. An electrical card holding member which is configured to hold a card having terminal members and side surfaces, the card holding member being configured to be inserted into a card connector in an insertion direction via a sealing portion of an outer member, the card holding member being configured to be ejected from the card connector in an ejection direction via the sealing portion of the outer member, the injection direction and the ejection direction being opposite one another, the sealing portion of the outer member having a first sealing portion and a pressure imparting portion, the card holding member comprising: a card holding frame portion which is configured to surround the side surfaces of the card and to face the side surfaces of the card; a connecting base portion integrally connected to the card holding frame portion, the connecting base portion having an outer peripheral surface, the outer peripheral surface having a first sealed portion formed thereon, the first sealed portion being configured to engage the first sealing portion of the sealing portion of the outer member; and a movable connecting portion which is slidably mounted on the connecting base portion such that the movable connecting portion can move relative to the connecting base portion in each of the insertion and ejection directions, the movable connecting portion having a pressure receiving portion, the pressure receiving portion being configured to engage the pressure imparting portion of the sealing portion of the outer member, the movable connecting portion being biased in the insertion direction by the outer member when the pressure receiving portion is engaged with the pressure imparting portion;
wherein the movable connecting portion has an outer peripheral surface, the outer peripheral surface of the movable connecting portion having a second sealed portion formed thereon, the second sealed portion being configured to engage a second sealing portion of the sealing portion of the outer member.

2. The electrical card holding member according to claim 1, wherein the movable connecting portion has an ejection auxiliary engaged portion, the ejection auxiliary engaged portion being configured to be engaged by an ejection auxiliary member, wherein, upon an application of force from the ejection auxiliary member in the ejection direction, the movable connecting portion slides in the ejection direction relative to the connecting base portion.

3. The electrical card holding member according to claim 2, wherein the connecting base portion has an engaged protrusion, wherein the movable connecting portion has an engaging protrusion, wherein the engaged protrusion of the connecting base portion is configured to engage the engaging protrusion of the movable connecting portion, wherein the connecting base portion is configured to slide in the ejection direction along with the movable connecting portion when the engaging protrusion engages the engaged protrusion.

4. The electrical card holding member according to claim 1, wherein the movable connecting portion has an outer peripheral surface and a cylindrical portion, the cylindrical portion being configured to receive the connecting base portion therein, the cylindrical portion being configured to be inserted into an insertion passage defined by the sealing portion of the outer member, wherein a space defined between an inner peripheral surface of the insertion passage and the outer peripheral surfaces of the connecting base portion and the movable connecting portion is sealed.

5. The electrical card holding member according to claim 1, wherein a rear surface of the movable connecting portion is flush with an outer surface of the outer member when the card holding member has been inserted into the card connector.

6. A card connector set comprising: a card connector; an outer member having a sealing portion, the sealing portion having a first sealing portion and a pressure imparting portion; and a card holding member which is configured to hold a card having terminal members and side surfaces, the card holding member being configured to be inserted into the card connector in an insertion direction via the sealing portion of the outer member, the card holding member being configured to be ejected from the card connector in an ejection direction via the sealing portion of the outer member, the injection direction and the ejection direction being opposite one another, the card holding member having a card holding frame portion, a connecting base portion, and a movable connecting portion, the card holding frame portion being configured to surround the side surfaces of the card and to face the side surfaces of the card, the connecting base portion being integrally connected to the card holding frame portion, the connecting base portion having an outer peripheral surface, the outer peripheral surface having a first sealed portion formed thereon, the first sealed portion being configured to engage the first sealing portion of the sealing portion of the outer member, the movable connecting portion being slidably mounted on the connecting base portion such that the movable connecting portion can move relative to the connecting base portion in each of the insertion and ejection directions, the movable connecting portion having a pressure receiving portion, the pressure receiving portion being configured to engage the pressure imparting portion of the sealing portion of the outer member, the movable connecting portion being biased in the insertion direction by the outer member when the pressure receiving portion is engaged with the pressure imparting portion;

wherein the sealing portion of the outer member has a second sealing portion, wherein the movable connecting portion has an outer peripheral surface, the outer peripheral surface of the movable connecting portion having a second sealed portion formed thereon, the second sealed portion being configured to engage the second sealing portion of the sealing portion of the outer member.

7. The electrical card connector set according to claim 6, further comprising an ejection auxiliary member, wherein the movable connecting portion has an ejection auxiliary engaged portion, the ejection auxiliary engaged portion being configured to be engaged by the ejection auxiliary member, wherein, upon an application of force from the ejection auxiliary member in the ejection direction, the movable connecting portion slides in the ejection direction relative to the connecting base portion.

8. The electrical card connector set according to claim 7, wherein the connecting base portion has an engaged protrusion, wherein the movable connecting portion has an engaging protrusion, wherein the engaged protrusion of the connecting base portion is configured to engage the engaging protrusion of the movable connecting portion, wherein the connecting base portion is configured to slide in the ejection direction along with the movable connecting portion when the engaging protrusion engages the engaged protrusion.

9. The electrical card connector set according to claim 6, wherein the sealing portion of the outer member defines an insertion passage having an inner peripheral surface, wherein the movable connecting portion has an outer peripheral surface and a cylindrical portion, the cylindrical portion being configured to receive the connecting base portion therein, the cylindrical portion being configured to be inserted into the insertion passage defined by the sealing portion of the outer member, wherein a space defined between the inner peripheral surface of the insertion passage and the outer peripheral surfaces of the connecting base portion and the movable connecting portion is sealed.

10. The electrical card connector set according to claim 6, wherein the outer member has an outer surface, wherein the movable connecting portion has a rear surface, wherein the rear surface of the movable connecting portion is flush with the outer surface of the outer member when the card holding member has been inserted into the card connector.

\* \* \* \* \*